(12) United States Patent
Decarreau et al.

(10) Patent No.: US 11,464,045 B2
(45) Date of Patent: Oct. 4, 2022

(54) RANDOM ACCESS (71) Applicant: NOKIA TECHNOLOGIES OY, Espoo (FI)

(72) Inventors: Guillaume Decarreau, Munich (DE); Irina-Mihaela Balan, Munich (DE); Muhammad Naseer-ul-Islam, Munich (DE)

(73) Assignee: Nokia Technologies Oy, Espoo (FI)

(*) Notice: Subject to any disclaimer, the term of this patent is extended or adjusted under 35 U.S.C. 154(b) by 37 days.

(21) Appl. No.: 17/250,021

(22) PCT Filed: May 7, 2018

(86) PCT No.: PCT/FI2018/050334
§ 371 (c)(1),
(2) Date: Nov. 4, 2020

(87) PCT Pub. No.: WO2019/215376
PCT Pub. Date: Nov. 14, 2019

(65) Prior Publication Data
US 2021/0243802 A1 Aug. 5, 2021

(51) Int. Cl.
H04W 74/00 (2009.01)
H04B 7/08 (2006.01)
(Continued)

(52) U.S. Cl.
CPC ......... *H04W 74/008* (2013.01); *H04B 7/088* (2013.01); *H04W 36/08* (2013.01);
(Continued)

(58) Field of Classification Search
CPC . H04W 74/008; H04W 36/08; H04W 56/001; H04W 74/02; H04W 74/0841;
(Continued)

(56) References Cited

U.S. PATENT DOCUMENTS 10,840,992 B2 * 11/2020 Wang .............. H04W 74/02
10,855,359 B2 * 12/2020 Zhou .............. H04W 52/50
(Continued)

FOREIGN PATENT DOCUMENTS

WO 2018064367 A1 4/2018

OTHER PUBLICATIONS

International Search Report and Written Opinion for International Application No. PCT/FI2018/050334, dated Aug. 29, 2018, 17 pages.
(Continued)

*Primary Examiner* — Harry H Kim
(74) *Attorney, Agent, or Firm* — Brake Hughes Bellermann LLP (57) ABSTRACT An apparatus is configured to transmit at least one first random access request by using a first preamble to a first handover target cell or to a first beam provided by a serving cell. If the first random access request is responded, the apparatus carries out a synchronization to the first handover target cell or to the first beam provided by the serving cell. If the first random access request is not responded, the apparatus transmits at least one second random access request by using at least one second preamble to at least one second handover target cell or to at least one second beam provided by the serving cell. The apparatus stores information on not-responded first or second random access requests or resources not used for random access requests, wherein the information comprises preambles used. The apparatus transmits, after being synchronized, the stored information to either the first handover target cell, the at least one second handover target cell or the serving cell for being used in random access resource allocation.

24 Claims, 4 Drawing Sheets (51) Int. Cl.
  *H04W 36/08* (2009.01)
  *H04W 56/00* (2009.01)
  *H04W 74/02* (2009.01)
  *H04W 74/08* (2009.01)
  *H04W 76/19* (2018.01)
  *H04B 7/06* (2006.01)
  *H04W 24/02* (2009.01)
  *H04W 24/10* (2009.01)
  *H04W 4/70* (2018.01)

(52) U.S. Cl.
  CPC ......... *H04W 56/001* (2013.01); *H04W 74/02* (2013.01); *H04W 74/0841* (2013.01); *H04W 76/19* (2018.02)

(58) Field of Classification Search
  CPC ..... H04W 76/19; H04W 24/02; H04W 24/10; H04W 74/002; H04W 4/70; H04B 7/088; H04B 7/0695
  See application file for complete search history.

(56) References Cited

U.S. PATENT DOCUMENTS

| | | | |
|---|---|---|---|
| 10,945,290 B2* | 3/2021 | Jeon | ............... H04W 74/004 |
| 2010/0232318 A1 | 9/2010 | Sarkar | |
| 2014/0241285 A1 | 8/2014 | Pang et al. | |
| 2016/0277977 A1 | 9/2016 | Wang et al. | |
| 2017/0331577 A1 | 11/2017 | Parkvall et al. | |
| 2017/0346545 A1 | 11/2017 | Islam et al. | |
| 2017/0366996 A1 | 12/2017 | Park et al. | |
| 2018/0020382 A1 | 1/2018 | Kim et al. | |
| 2019/0028942 A1* | 1/2019 | Tang | ............... H04W 74/0833 |
| 2019/0208436 A1* | 7/2019 | Zhou | ............... H04L 1/1819 |
| 2019/0215888 A1* | 7/2019 | Cirik | ............... H04W 72/042 |
| 2020/0213034 A1* | 7/2020 | Zhou | ............... H04W 24/10 |
| 2021/0168683 A1* | 6/2021 | Peisa | ............... H04B 7/0626 |

OTHER PUBLICATIONS

Office Action for India Application No. 202047052459, dated Dec. 14, 2021, 9 pages.
European Search Report for Application No. 18918371.8, dated Dec. 16, 2021, 12 pages.
3GPP TSG-RAN WG3 #64; R3-091109; "UE Based Measurements for RACH Optimisation"; Agenda Item: 10.4.2; Source: Huawei; San Francisco, California, USA; May 4-8, 2009; 3 pages.
3GPP TSG RAN WG3 #65; R3-091664; "UE Measurements for Failed RACH Procedure"; Agenda item: 10.3.1; Source: ZTE; Shenzhen, China; Aug. 24-28, 2009; 2 pages.

* cited by examiner

RANDOM ACCESS

CROSS-REFERENCE TO RELATED APPLICATIONS

This application is a national stage entry of International Application No. PCT/FI2018/050334, filed May 7, 2018, entitled "RANDOM ACCESS" which is hereby incorporated by reference in its entirety.

FIELD

The invention relates to communications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In Long Term Evolution (LTE) systems, handover may be performed by a user device when running out of the coverage of a current serving cell and a target cell with good enough quality has been found.

In New Radio (NR), when operating in mm wave frequency band, a cell may be composed of multiple beams. A user device may be served by a specific beam in a serving cell. The beam mobility within a cell may be handled at physical and MAC sublayer and may thus be transparent for higher layers. When beam operations are used, a handover may be triggered at Layer 3 by using cell quality measurements of the source and target cell. But in fact, the user device may be served by one beam in a source cell and after the handover, it may be served by one beam in a target cell.

BRIEF DESCRIPTION

According to an aspect, there is provided an apparatus comprising: at least one processor and at least one memory including a computer program code, the at least one memory and the computer program code configured to, with the at least one processor, cause the apparatus at least to: transmit at least one first random access request by using a first preamble to a first handover target cell or to a first beam provided by a serving cell, if responded, carry out a synchronization to the first handover target cell or to the first beam provided by the serving cell, if not responded, transmit at least one second random access request by using at least one second preamble to at least one second handover target cell or to at least one second beam provided by the serving cell; store information on not-responded random access requests and/or resources not used for random access requests, wherein the information comprises preambles used, and transmit, after being synchronized, the stored information to the first handover target cell, the at least one second handover target cell and/or the serving cell for being used in random access resource allocation.

According to an aspect, there is provided an apparatus comprising: at least one processor and at least one memory including a computer program code, the at least one memory and the computer program code configured to, with the at least one processor, cause the apparatus at least to: receive, by an access node, information on not-responded random access requests and/or resources not used for random access requests, wherein the information comprises random access preambles; analyze the information for finding out resources used for unsuccessful random access attempts or not used for random access attempts, the resources being indicated by the random access preambles, and avoid allocating the resources used for unsuccessful random access attempts and/or the resources not used for random access requests for further random access request transmissions.

According to an aspect, there is provided a method comprising: transmitting at least one first random access request by using a first preamble to a first handover target cell or to a first beam provided by a serving cell, if responded, carrying out a synchronization to the first handover target cell or to the first beam provided by the serving cell, if not responded, transmitting at least one second random access request by using at least one second preamble to at least one second handover target cell or to at least one second beam provided by the serving cell; storing information on not-responded random access requests and/or resources not used for random access requests, wherein the information comprises preambles used, and transmitting, after being synchronized, the stored information to the first handover target cell, the at least one second handover target cell and/or the serving cell for being used in random access resource allocation.

According to an aspect, there is provided a method comprising: receiving, by an access node, information on not-responded random access requests and/or resources not used for random access requests, wherein the information comprises random access preambles; analyzing the information for finding out resources used for unsuccessful random access attempts or not used for random access attempts, the resources being indicated by the random access preambles, and avoiding allocating the resources used for unsuccessful random access attempts and/or the resources not used for random access requests for further random access request transmissions. According to an aspect, there is provided an apparatus comprising means for transmitting at least one first random access request by using a first preamble to a first handover target cell or to a first beam provided by a serving cell, means for carrying out, if responded, a synchronization to the first handover target cell or to the first beam provided by the serving cell, means for transmitting, if not responded, at least one second random access request by using at least one second preamble to at least one second handover target cell or to at least one second beam provided by the serving cell; means for storing information on not-responded random access requests and/ or resources not used for random access requests, wherein the information comprises preambles used, and means for transmitting, after being synchronized, the stored information to the first handover target cell, the at least one second handover target cell and/or the serving cell for being used in random access resource allocation.

According to an aspect, there is provided an apparatus comprising means for receiving, by an access node, information on not-responded random access requests and/or resources not used for random access requests, wherein the information comprises random access preambles; means for analyzing the information for finding out resources used for unsuccessful random access attempts or not used for random access attempts, the resources being indicated by the random access preambles, and means for avoiding allocating the resources used for unsuccessful random access attempts and/or the resources not used for random access requests for further random access request transmissions.

According to an aspect, there is provided a distributed system, comprising: means for receiving, information on not-responded random access requests and/or resources not used for random access requests, wherein the information comprises random access preambles; means for analyzing the information for finding out resources used for unsuccessful random access attempts, the resources being indicated by the random access preambles, and means for avoiding allocating the resources used for unsuccessful random access attempts and/or the resources not used for random access requests for further random access request transmissions.

A computer program product for a computer, comprising software code portions for performing, when said product is run on the computer: transmitting at least one first random access request by using a first preamble to a first handover target cell or to a first beam provided by a serving cell, if responded, carrying out a synchronization to the first handover target cell or to the first beam provided by the serving cell, if not responded, transmitting at least one second random access request by using at least one second preamble to at least one second handover target cell or to at least one second beam provided by the serving cell; storing information on not-responded random access requests and/or resources not used for random access requests, wherein the information comprises preambles used, and transmitting, after being synchronized, the stored information to the first handover target cell, the at least one second handover target cell and/or the serving cell for being used in random access resource allocation.

A computer program product for a computer, comprising software code portions for performing, when said product is run on the computer: receiving, by an access node, information on not-responded random access requests and/or resources not used for random access requests, wherein the information comprises random access preambles; analyzing the information for finding out resources used for unsuccessful random access attempts or not used for random access attempts, the resources being indicated by the random access preambles, and avoiding allocating the resources used for unsuccessful random access attempts and/or the resources not used for random access requests for further random access request transmissions.

LIST OF DRAWINGS

Some embodiments of the present invention are described below, by way of example only, with reference to the accompanying drawings, in which.

DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
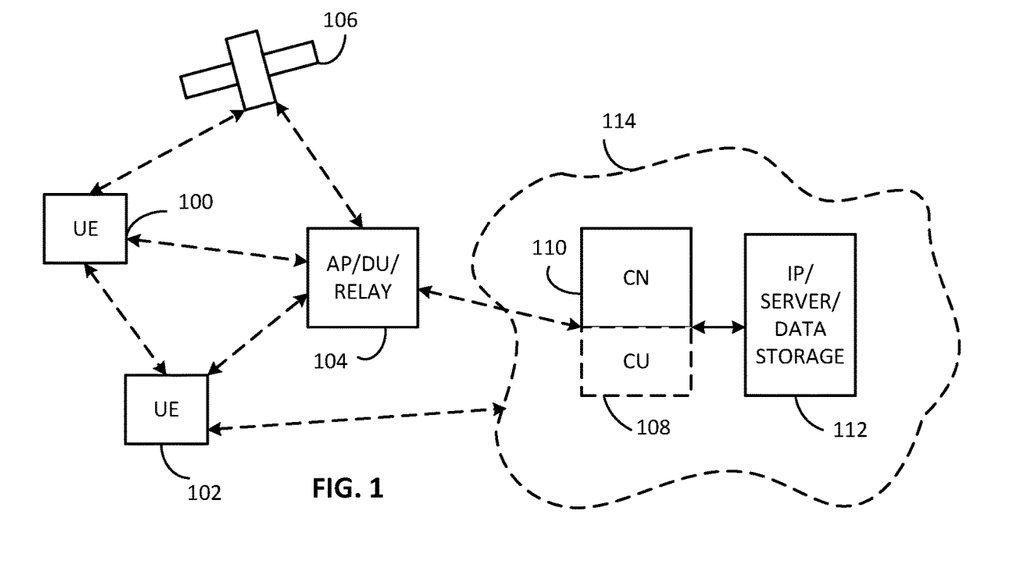
FIG. 1 illustrates an example of a system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, also including a relay node. An example of such a relay node is a layer 3 relay (self-backhauling relay) towards a base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In the following, embodiments suitable for a random access resource allocation are disclosed in further detail. Random access procedure is provided for establishing a radio channel between a radio communication terminal device, such as a user device and an access node. The first step in the random access procedure is a user device transmitting a random access preamble. The main purpose of the preamble is to indicate to a network that a random access attempt exists and to obtain uplink time synchronization. Prior to transmitting a random access request (preamble), the user device has obtained downlink synchronization as a part of cell-search procedure.

In contention free random access (CFRA), a user device has a dedicated (temporary valid) random access preamble and in contention-based random access, the user device selects a random access preamble from a pool of preambles allocated to a cell the user device is trying to access to. An access node may inform random access preamble(s) on a broadcast channel.

A random access request (preamble) is typically transmitted on a random access channel (RACH) which is a common physical channel dedicated to the random access procedure. Uplink transmissions are generally initiated through a RACH. RACH is typically an uplink common channel used for transmitting control information and user data. An access node may inform the location and period of RACH time slots and a frequency band on the broadcast channel.

In Long Term Evolution (LTE) systems, handover is performed by a user device when running out of the coverage of a current serving cell and a target cell with good enough quality has been found.

In New Radio (NR), in higher frequency bands, coverage is provided by a set of narrow beams that form the cell, which will likely impact the way mobility and system access procedures are designed.

The beam mobility within a cell is handled at physical and MAC sublayer and are transparent for higher layers. When beam operations are used, a handover is triggered at Layer 3 by using cell quality measurements of the source and target cell. But in fact, the user device may be served by one beam of a source cell and after the handover, it may be served by one beam of a target cell.

For supporting user device's mobility in beam-based operation, a handover target cell may provide dedicated random access (RA) resources (preamble, RACH time slots and/or frequency band/carrier) for multiple beams or synchronization signal (SS) blocks for a user device's access to the handover target cell. The user device may send a random access request comprising a random access preamble to more than one of these resources before getting a random access response (RAR). It should be appreciated, that the random access resources may be provided for a beam failure recovery (BFR) procedure as well. It should be appreciated that random access resources may also be allocated group-based, for example in machine-to-machine communications.

When a user device receives a random access response, the target cell only knows on which random access resource the user device carried out the successful attempt, but it does not know whether the user device made previous attempts or not, neither the resources used in those attempts.

Some embodiments provide an option to enable a more efficient resource reservation for a random access.

It should be appreciated that the coding of software for carrying out the embodiments shown and described below is well within the scope of a person of ordinary skill in the art.

Figure 2:
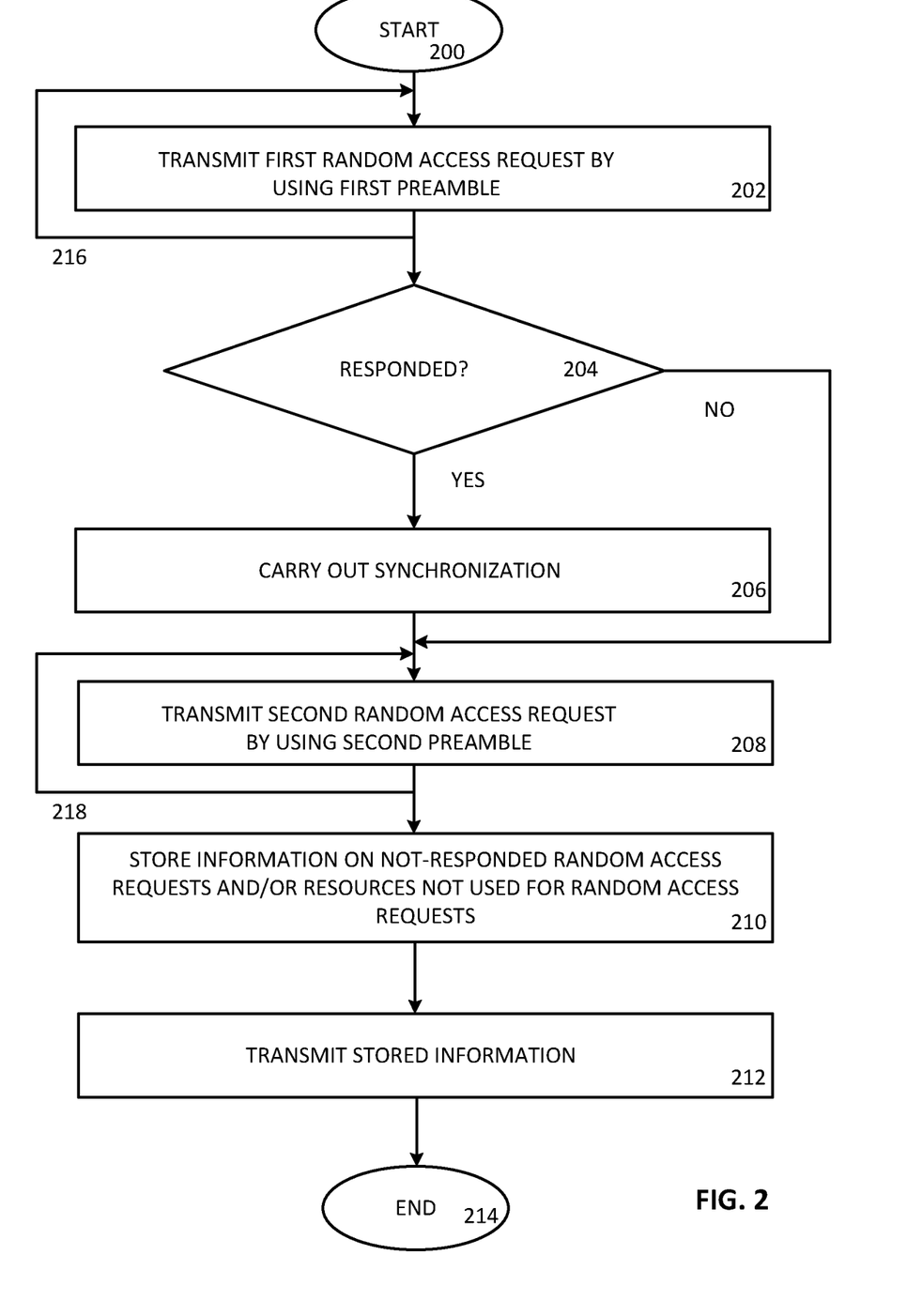
FIG. 2 is a flow chart.

One embodiment starts in block 200 of FIG. 2. This embodiment is suitable for being carried out by a user device. Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

In block 202, at least one first random access request is transmitted by using a first preamble to a first handover target cell or to a first beam provided by a serving cell.

Transmitting a random access preamble may be triggered by handover or a beam failure recovery.

Random access preamble may be random access radio network identifier (RA-RNTI) or any suitable parameter.

For the purpose of a handover, a user device may send an event based measurement report to an access node controlling the source cell (CU part of gNB, for example). It may comprise cell quality indicator and measurement results and/or, in the case of beam-based measurements, beam identity of at least one beam in the source and target cells. The handover command may comprise a list of dedicated and/or common random access resources corresponding to different beams or cells in the target cell.

When a user device is not able to communicate anymore with a serving beam, it may perform a beam failure recovery procedure using resources configured by network.

The user device may choose the order of cells and/or beams for random access attempts. Typically, the user device selects the strongest cell or beam first, but other criteria may also be used, such as cell load, cell size compared to mobility, quality of service available in cells/beams, which operator provides the network, etc. The precise algorithm or criteria used for the selection is not limiting to the implementation of embodiments.

It should be appreciated that dedicated RACH configuration allocates RACH resource(s) together with a respective quality threshold. When dedicated RACH resources are provided, they are prioritized by a user device and the user device shall not switch to contention-based RACH resources as long as the quality threshold of those dedicated resources is met.

In NR, random access requests associated with delay sensitive services may be configured to apply a combination of preambles (or preamble signatures) at a given random access time slot.

Specifically, a higher priority device may transmit a plurality of preambles, and even though a collision may occur with the preamble transmitted by a lower priority device, the network is able to detect the high priority device and grant transmission resources to it. Thus, in some cases, a first preamble may comprise a plurality of preambles transmitted by using different time slots, for example.

It should be understood that the transmission of the first preamble may be repeated, usually as timer controlled, if a random access response is not repeated in a given period of time.

In blocks 204 and 206, if responded, synchronization is carried out to the first handover target cell or to the first beam provided by the serving cell.

In the case of a handover, the synchronization is carried out to a handover target cell. However, it should be appreciated that the handover may also be carried as beam-based, meaning that the handover target cell may comprise several beams and that in practice, the handover is carried out to a certain beam in the handover target cell.

In the case of a beam failure recovery, the user device usually tries first a radio access to another beam provided by the current serving cell.

The response may be a random access response, which may comprise uplink grant, timing advance and a temporary identity (cell radio network temporary identity, C-RNTI, for example). The response may also comprise the responded preamble.

In LTE, synchronization is based on a primary synchronization signal (PSS) and a secondary synchronization signal (SSS). In NR, a broadcasted synchronization signal is used as well.

However, since in 5G resources are allocated service-based (network slicing), synchronization requirements may vary.

It should be understood that in the case synchronization and reference signals (e.g. for neighbor measurements) are beamformed, the fact that a user device may need to detect a beam that may have a narrow coverage will lead to the need for a direction synchronization procedure in addition to time and frequency synchronization, either for data transmission or acquisition of system information.

In blocks 204 and 208, if not responded, at least one second random access request is transmitted by using at least one second preamble to at least one second handover target cell or to at least one second beam provided by the serving cell.

Again, the user device may choose the order of cells and/or beams for random access attempts. Typically, the user device selects the second strongest cell or beam as a next choice, but other criteria may also be used, such as cell load, cell size compared to mobility, quality of service available in cells/beams, which operator provides the network, etc. The precise algorithm or criteria used for the selection is not limiting to the implementation of embodiments.

It should be appreciated that dedicated RACH configuration allocates RACH resource(s) together with a respective quality threshold. When dedicated RACH resources are provided, they are prioritized by a user device and the user device shall not switch to contention-based RACH resources as long as the quality threshold of those dedicated resources is met.

In NR, random access requests associated with delay sensitive services may be configured to apply a combination of preambles (or preamble signatures) at a given random access time slot. Specifically, a higher priority device may transmit a plurality of preambles, and even though a collision may occur with the preamble transmitted by a lower priority device, the network is able to detect the high priority device and grant transmission resources to it. Thus, in some cases, a second preamble may comprise a plurality of preambles transmitted by using different time slots, for example.

It should be understood that the transmission of the at least one second preamble may be repeated, usually as timer controlled, if a random access response is not responded in a given period of time.

If the second random access request is not responded, the user device may continue the efforts with yet another preamble to yet another cell or beam and the procedure is repeated. The procedure may be repeated with as many preambles and to as many cells of beams as provided by a configuration or controlled with a counter or timer, for example. It should be understood that the cell of beam may also be a so called recovery cell or beam with regard to cell search procedure.

The response may be a random access response, which may comprise uplink grant, timing advance and a temporary identity (cell radio network temporary identity, C-RNTI, for example). The response may also comprise the responded preamble.

In block 210, information on not-responded random access requests and/or resources not used for random access requests is stored, wherein the information comprises preambles used.

The information may comprise the number of the preambles, random access resources used, associated SS-blocks, associated reference signals (such as channel state information reference signal, CSI-RS), transmission powers, transmission times (time slots used), random access radio network temporary identifier (RA-RNTI), the number of efforts using a certain preamble, the number of efforts using a certain resource, order of the non-responded random access requests, information whether the random access request was part of the contention-based random access or contention-free random access procedure and/or information on radio channel measurements. The information may comprise, as an option or additionally, information on responded random access requests.

The information may be stored in a table. It may also be time stamped for dropping out too old information.

The information may be cell-specific and/or beam-specific.

In block 212, transmitting, after being synchronized, the stored information to the first handover target cell, the at least one second handover target cell and/or the serving cell for being used in random access resource allocation.

After the random access response, the procedure continues with setting up a radio connection for data reception and transmission (or for further signaling), for example by the user device transmitting a radio resource control connection (RRC) request using resources assigned in the random access response.

It should be appreciated that the procedure continues with setting up a radio connection for data reception and transmission (or further control signaling) also for block 206 synchronization.

Synchronization procedure and procedures carried out after it for achieving a possibility to transmit and receive data (user data or control data) are basically the same in both cases.

The stored information may be transmitted as a part of a RRC connection request or as a part of RRC connection complete message or as a dedicated signaling message, for example on a dedicated or common control channel.

In principle, the user device transmits the information to a next cell is has a radio connection to. The information may be forwarded to target cells the user device tried to make an access to but failed.

An access node may use the information a user device collects on random access attempts in resource allocation for future random access procedures of user devices. The access node may, for example try to avoid allocating the resources used for unsuccessful random access attempts and/or the resources not used for random access requests and/or the access node may prefer the resources used for the responded random access requests. The information may thus be used in enhancing efficiency in resource usage.

The embodiment ends in block 214. The embodiment(s) is repeatable in many ways. Two examples are shown by arrows 216 and 218 in FIG. 2. It should be understood that the embodiment(s) may be repeated one or more times with a constant or variable pause between separate rounds. The option shown by arrow 216 depicts how the transmission of the first random access preamble can be repeated and the option shown by arrow 218 depicts how the transmission of the at least one second random access preamble can be repeated.

Figure 3:
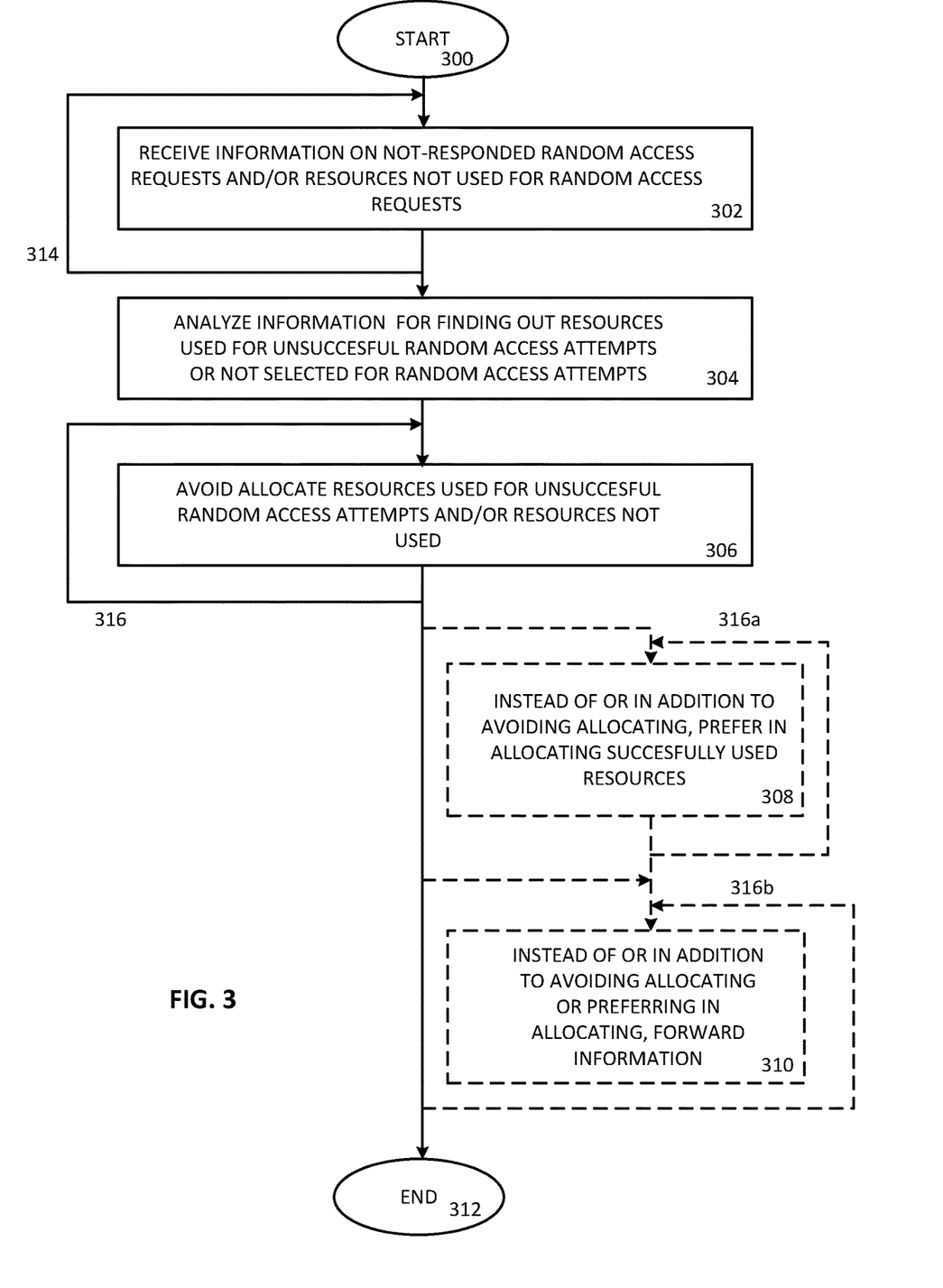
FIG. 3 is another flow chart.

Another embodiment starts in block 300 of FIG. 3. This embodiment is suitable for being carried out by an access node, such as gNB (may be implemented as a CU or DU or a combination thereof). Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

In block 302, information on not-responded random access requests and/or resources not used for random access requests is received. The information comprises random access preambles (or preamble signatures).

The information may comprise the numbers of the preambles, random access resources used, associated SS-blocks, associated reference signals (such as channel state information reference signal, CSI-RS), transmission powers, transmission times (time slots used), random access radio network temporary identifier (RA-RNTI), the number of efforts using a certain preamble, the number of efforts using a certain resource, order of the non-responded random access requests, information whether the random access request was part of the contention-based random access or contention-free random access procedure and/or information on radio channel measurements.

The information may comprise, as an option or additionally, information on responded random access requests.

The information may be cell-specific and/or beam-specific.

The stored information may be received as a part of a radio resource control (RRC) request or as a part of RRC connection setup complete message or as a dedicated signaling message, for example on a dedicated or common control channel.

In block 304, the information is analyzed for finding out resources used for unsuccessful random access attempts or not used for random access attempts, the resources being indicated by the random access preambles.

If the information comprises, as an option or additionally, information on responded random access requests, it may be analyzed for finding out successfully used resources.

In the analysis, the information may also be combined with other information gathered with regard to user devices, such as location information.

The analysis may be carried out in a central unit (CU) of a gNB, for example. The analysis may also be carried out by an eNB or by using cloud computing. It is also possible to store data received from more than one user device and use it for the analysis. Another option is to store data from a plurality of user devices into cloud and request the data or a part of it for analysis by an access node. The data may be received directly from at least one user device or via another access node or via a memory storage located, for example, in a cloud (data drop).

The analysis may be statistical, for example, number of unsuccessful attempts per a certain resource, number of successful attempts per a certain resource, counting a success ratio (how many times successful or unsuccessful effort took place in all efforts by using a certain resource), period of time a certain resource has not been used. The analysis may be made for a defined period of time, for example for preventing from using too old data for improved reliability.

In block 306, the resources used for unsuccessful random access attempts and/or the resources not used for random access requests are avoided in allocating resources for further random access request transmissions.

The resource allocation may be carried out in a central unit (CU) of a gNB, for example. The analysis may also be carried out by an eNB or by using cloud computing (latency requirements are taken into account). For latency reasons, the allocation may be carried out in a distributed unit (DU), where the results of the analysis of block 304 may be stored.

In resource allocation, a plurality of options exists: transmission power may be raised, a RACH time slot may be chosen among the ones with the highest success rate and/or frequency band/carrier may be chosen among the ones with the highest success rate. On the other hand, if a certain frequency band/carrier is not used by any user device for quite a long period of time, it is not allocated. If in analysis it is noticed that a certain resource frequently leads to unsuccessful attempts in a certain geographical area, such as in a certain beam, it is not allocated for that beam. Other options naturally exists.

It should be understood that the nature of service may also be taken into consideration, for example, the best resources may be allocated to the most latency and/or reliability critical services, where quick handover is needed.

Instead of or in addition to the avoiding allocating (block 308), preferring in the allocating successfully used random access resources. For preferring successful resources, the access node may use information on the random access resource allocation it carried out combined with information received from one or more user devices on unsuccessful resources and not used resources. Another option is to receive information comprises information on unsuccessful resources, not used resources and successfully used resources from one or more user devices directly or via another access node.

Instead of or in addition to avoiding allocating and/or preferring in the allocating certain resources (block 310), the access node may forward the information and/or result of the analyzing to another access node.

Additionally, based on the analysis, at least one quality threshold for at least one dedicated random access resource may be configured based on the resources used for unsuccessful random access attempts in an effort to help a user device choose a successful resource. The quality threshold may be given for a frequency band or carrier based on measurement reports received from one or more user device as a part of a normal procedure in radio network operations. The access node may store the measurement reports for this usage.

The embodiment ends in block 312. The embodiment(s) is repeatable in many ways. Two examples are shown by arrows 314 and 316 in FIG. 3. It should be understood that the embodiment(s) may be repeated one or more times with a constant or variable pause between separate rounds. The option shown by arrow 314 depicts how the information may be received from one or more user devices (directly or via another access node or from cloud) one or more times for the analysis. The option shown by arrow(s) 316 (316a, 316b) depicts how the resource allocation may be repeated based on new analysis. Naturally the analyzing may be repeated as well.

Figure 4:
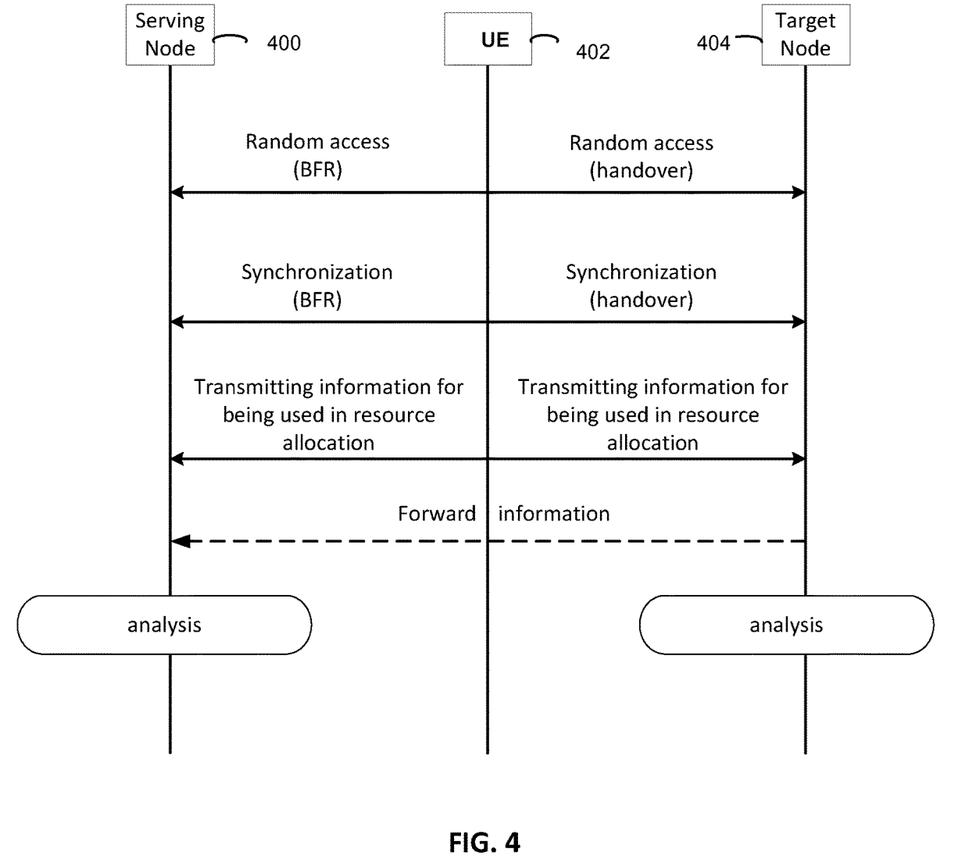
FIG. 4 is a signaling chart.

In the following, some examples of embodiments described above by means of FIGS. 2 and 3 are clarified by means of example signaling chart of FIG. 4. The Figure is simplified for the sake of clarity and further detail can be found in FIGS. 2 and 3. In FIG. 4, user device (UE) 402 may be UE 100 or 102 and serving access node 400 DU/CU 100 104/108, and handover target node 404 may be a similar DU/CU combination. The serving access node as well as the handover target node may also be DUs or located in CUs depending on the implementation. The following is an example only and it should not be taken as limiting to the embodiments.

In this example, user device 402 transmits a random access preamble to serving access node 400, if the trigger is beam failure recovery and to handover target node, if the trigger is handover. Then, after being synchronized, the user device transmits the information with regard to its random access attempts to either the serving access node or to the handover target node depending on the case (BFR or handover). The target handover node may forward the information to the serving access node. Then either the serving access node or the handover target node, or both, are able to carry out analysis of the information.

The user device may transmit information on random access attempts as a part of a radio resource control (RRC) connection request or as a part of RRC connection complete message or as a dedicated signaling message, for example on a dedicated or common control channel.

Figure 5:
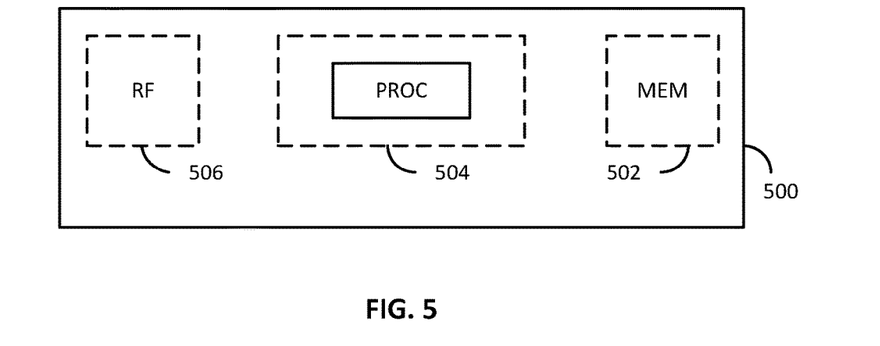
FIG. 5 illustrates an example of apparatuses.

FIG. 5 illustrates a simplified block diagram of an apparatus according to an embodiment in relation to FIGS. 2 and/or 4.

An embodiment provides an apparatus which may be a user device or any other suitable apparatus capable to carry out processes described above in relation to FIGS. 2 and/or 4.

It should be appreciated that the apparatus may include or otherwise be in communication with a control unit, one or more processors or other entities capable of carrying out operations according to the embodiments described by means of FIGS. 2 and/or 4. It should be understood that each block of the flowchart of FIG. 2 and any combination thereof may be implemented by various means or their combinations, such as hardware, software, firmware, one or more processors and/or (electronic) circuitry. Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

As an example of an apparatus according to an embodiment, it is shown apparatus 500, such as a user device, including facilities in control unit or circuit/circuitry 504 (including one or more processors, for example) to carry out functions of embodiments according to FIGS. 2 and/or 4. The facilities may be software, hardware or combinations thereof as described in further detail below.

In FIG. 5, block 506 includes parts/units/modules needed for reception and transmission, usually called a radio front end, RF-parts, radio parts, remote radio head, etc. The parts/units/modules needed for reception and transmission may be comprised in the apparatus or they may be located outside the apparatus the apparatus being operationally coupled to them. The apparatus may also include or be coupled to one or more internal or external memory units.

Another example of apparatus 500 may include at least one processor 504 and at least one memory 502 including a computer program code, the at least one memory and the computer program code configured to, with the at least one processor, cause the apparatus at least to: transmit at least one first random access request by using a first preamble to a first handover target cell or to a first beam provided by a serving cell, if responded, carry out a synchronization to the first handover target cell or to the first beam provided by the serving cell, if not responded, transmit at least one second random access request by using at least one second preamble to at least one second handover target cell or to at least one second beam provided by the serving cell; store information on not-responded random access requests and/or resources not used for random access requests, wherein the information comprises preambles used, and transmit, after being synchronized, the stored information to the first handover target cell, the at least one second handover target cell and/or the serving cell for being used in random access resource allocation.

It should be understood that the apparatus may include or be coupled to other units or modules etc., such as radio parts or radio heads, used in or for transmission and/or reception. This is depicted in FIG. 5 as optional block 506.

Yet another example of an apparatus comprises means (504, 506) for transmitting at least one first random access request by using a first preamble to a first handover target cell or to a first beam provided by a serving cell, means for (504, 506) carrying out, if responded, a synchronization to the first handover target cell or to the first beam provided by the serving cell, means (504, 506) for transmitting, if not responded, at least one second random access request by using at least one second preamble to at least one second handover target cell or to at least one second beam provided by the serving cell; means (502) for storing information on not-responded random access requests and/or resources not used for random access requests, wherein the information comprises preambles used, and means (502, 506) for transmitting, after being synchronized, the stored information to the first handover target cell, the at least one second handover target cell and/or the serving cell for being used in random access resource allocation.

It should be understood that the apparatus may include or be coupled to other units or modules etc., such as radio parts or radio heads, used in or for transmission and/or reception. This is depicted in FIG. 5 as optional block 506. The apparatus may also include or be coupled to a communications or user interface.

Although the apparatuses have been depicted as one entity in FIG. 5, different modules and memory may be implemented in one or more physical or logical entities.

Figure 6:
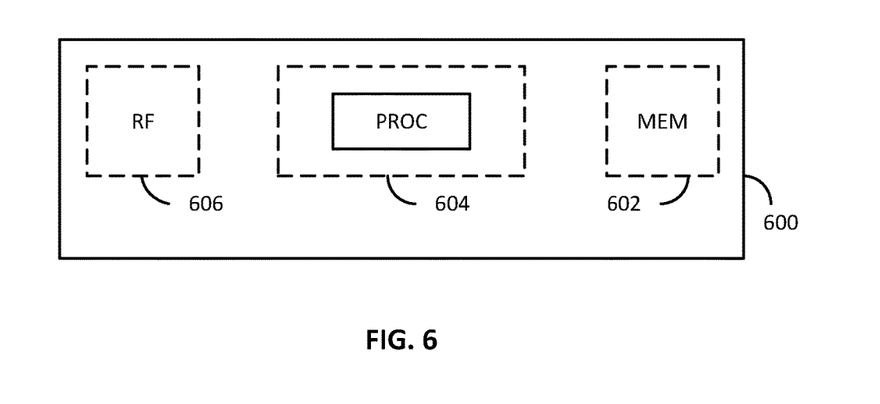
FIG. 6 illustrates another example of apparatuses.

FIG. 6 illustrates a simplified block diagram of an apparatus according to an embodiment in relation to FIGS. 3 and/or 4.

Another embodiment provides an apparatus which may be a node (network node, access node), server, host or any other suitable apparatus capable to carry out processes described above in relation to FIGS. 3 and/or 4. The apparatus is suitable for operating as a serving access node.

It should be appreciated that the apparatus may include or otherwise be in communication with a control unit, one or more processors or other entities capable of carrying out operations according to the embodiments described by means of FIGS. 3 and/or 4. It should be understood that each block of the flowchart of FIG. 3 and any combination thereof may be implemented by various means or their combinations, such as hardware, software, firmware, one or more processors and/or circuitry. Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

As an example of an apparatus according to an embodiment, it is shown apparatus 600, such as an access node, including facilities in control unit or circuit/circuitry 604 (including one or more processors, for example) to carry out functions of embodiments according to FIGS. 3 and/or 4. The facilities may be software, hardware or combinations thereof as described in further detail below.

In FIG. 6, block 606 includes parts/units/modules needed for reception and transmission, usually called a radio front end, RF-parts, radio parts, remote radio head, etc. The parts/units/modules needed for reception and transmission may be comprised in the apparatus or they may be located outside the apparatus the apparatus being operationally coupled to them. The apparatus may also include or be coupled to one or more internal or external memory units.

Another example of apparatus 600 may include at least one processor 604 and at least one memory 602 including a computer program code, the at least one memory and the computer program code configured to, with the at least one processor, cause the apparatus at least to: receive, by an access node, information on not-responded random access requests and/or resources not used for random access requests, wherein the information comprises random access preambles; analyze the information for finding out resources used for unsuccessful random access attempts or not used for random access attempts, the resources being indicated by the random access preambles, and avoid allocating the resources used for unsuccessful random access attempts and/or the resources not used for random access requests for further random access request transmissions.

It should be understood that the apparatus may include or be coupled to other units or modules etc., such as radio parts or radio heads, used in or for transmission and/or reception. This is depicted in FIG. 6 as optional block 606.

Yet another example of an apparatus comprises means (604, 606) for receiving information on not-responded random access requests and/or resources not used for random access requests, wherein the information comprises random access preambles; means (602, 604) for analyzing the information for finding out resources used for unsuccessful random access attempts or not used for random access attempts, the resources being indicated by the random access preambles, and means (602, 604) for avoiding allocating the resources used for unsuccessful random access attempts and/or the resources not used for random access requests for further random access request transmissions.

It should be understood that the apparatus may include or be coupled to other units or modules etc., such as radio parts or radio heads, used in or for transmission and/or reception. This is depicted in FIG. 6 as optional block 606.

Although the apparatuses have been depicted as one entity in FIG. 6, different modules and memory may be implemented in one or more physical or logical entities.

It should be appreciated that the operations of the apparatus may also be carried out by a distributed system comprising a central unit of a gNB and a distributed unit of the gNB optionally aided by cloud services, such as a cloud memory. This option is further explained above with regard to FIGS. 1 and 3. The distributed computing system may comprise: means for receiving information on not-responded random access requests and/or resources not used for random access requests, wherein the information comprises random access preambles; means for analyzing the information for finding out resources used for unsuccessful random access attempts, the resources being indicated by the random access preambles, and means for avoiding allocating the resources used for unsuccessful random access attempts and/or the resources not used for random access requests for further random access request transmissions.

An apparatus may in general include at least one processor, controller, unit, module or (electronic) circuitry designed for carrying out functions of embodiments operationally coupled to at least one memory unit (or service) and to typically various interfaces. A circuitry may refer to hardware-only circuit implementations, such as implementations in only analog and/or digital circuitry, combinations of circuits and software (and/or firmware), such as different kind of processors of portions of them, software and/or circuit components, such as a microprocessor(s) or a portion of a microprocessor(s). Further, the memory units may include volatile and/or non-volatile memory. The memory unit may store computer program code and/or operating systems, information, data, content or the like for the processor to perform operations according to embodiments described above in relation to FIGS. 2, 3 and/or 4. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be an electronic circuit or a system of electronic circuits performing a particular function in an electronic device with a computer program code. The electronic circuit may comprise at least one processor and additionally at least one internal or external memory. It should be understood that the term circuit/circuitry or electronic circuit may refer to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of circuit/circuitry applies to all uses of this term in this application.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. The data storage medium may be a non-transitory medium. The computer program or computer program product may also be downloaded to the apparatus. A computer program product may comprise one or more computer-executable components which, when the program is run, for example by one or more processors possibly also utilizing an internal or external memory, are configured to carry out any of the embodiments or combinations thereof described above by means of FIGS. 2, 3 and/or 4. The one or more computer-executable components may be at least one software code or portions thereof. Computer programs may be coded by a programming language or a low-level programming language.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Embodiments provide computer programs comprising instructions which, when the program is executed by an apparatus, cause the apparatus to carry out embodiments described by means of FIG. 2 or 3.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor and at least one memory including a computer program code, the at least one memory and the computer program code configured to, with the at least one processor, cause the apparatus at least to:
transmit at least one first random access request by using a first preamble to a first handover target cell or to a first beam provided by a serving cell,
if responded, carry out a synchronization to the first handover target cell or to the first beam provided by the serving cell,
if not responded, transmit at least one second random access request by using at least one second preamble to at least one second handover target cell or to at least one second beam provided by the serving cell;
store information on not-responded first or second random access requests or resources not used for first or second random access requests, wherein the information comprises preambles used, and
transmit, after being synchronized, the stored information to the first handover target cell, the at least one second handover target cell or the serving cell for being used in random access resource allocation.

2. The apparatus of claim 1, wherein the information further comprises at least one of the following: number of the preambles, random access resources used, associated synchronization signal blocks, associated reference signals, transmission powers, transmission times (time slots used), random access radio network temporary identifier, number of efforts using a certain preamble, number of efforts using a certain resource, order of the non-responded random access requests, information whether the random access request was part of the contention-based random access or contention-free random access procedure and information on radio channel measurements.

3. The apparatus of claim 1, wherein the information further comprises information on responded random access requests.

4. The apparatus of claim 1, wherein the information is cell-specific or beam-specific.

5. The apparatus of claim 1, wherein the random access request cause is a handover or a beam failure recovery procedure.

6. An apparatus comprising:
at least one processor and at least one memory including a computer program code, the at least one memory and the computer program code configured to, with the at least one processor, cause the apparatus at least to:
receive, by an access node, information on not-responded random access requests or resources not used for random access requests, wherein the information comprises random access preambles;
analyze the information for finding out resources used for unsuccessful random access requests or not used for random access requests, the resources being indicated by the random access preambles, and
avoid allocating the resources used for unsuccessful random access requests or the resources not used for random access requests for further random access request transmissions.

7. The apparatus of claim 6, wherein the information further comprises at least one of the following: number of the preambles, random access resources used, associated synchronization signal blocks, associated reference signals, transmission powers, transmission times (time slots used), random access radio network temporary identifier, number of efforts using a certain preamble, number of efforts using a certain resource, order of the non-responded random access requests, information whether the random access request was part of the contention-based random access or contention-free random access procedure and information on radio channel measurements.

8. The apparatus of claim 6, wherein the information further comprises information on responded random access requests, and the at least one processor and at least one memory including a computer program code, the at least one memory and the computer program code are further configured to, with the at least one processor, cause the apparatus at least to prefer the resources used for the responded random access requests in allocating resources for the further random access request transmissions.

9. The apparatus of claim 6, wherein the configuration further comprises a random access update release precondition for the least one handover candidate cell for the user device stop carrying out the measurements, if the random access update release precondition is fulfilled.

10. The apparatus of claim 6, further comprising causing the apparatus to, instead of or in addition to the avoiding allocating, preferring in the allocating successfully used random access resources.

11. The apparatus of claim 6, further comprising causing the apparatus to, instead of or in addition to the avoiding allocating, forwarding the information or result of the analyzing to another access node.

12. The apparatus of claim 6, further comprising: causing the apparatus to, instead of or in addition to the avoiding allocating, prefer in the allocating successfully used random access resources and instead of or in addition to the avoiding allocating or the preferring in the allocating successfully used random access resources, forward the information or result of the analyzing to another access node.

13. A method comprising:
transmitting at least one first random access request by using a first preamble to a first handover target cell or to a first beam provided by a serving cell,
if responded, carrying out a synchronization to the first handover target cell or to the first beam provided by the serving cell,
if not responded, transmitting at least one second random access request by using at least one second preamble to at least one second handover target cell or to at least one second beam provided by the serving cell;
storing information on not-responded first or second random access requests or resources not used for first or second random access requests, wherein the information comprises preambles used, and
transmitting, after being synchronized, the stored information to the first handover target cell, the at least one second handover target cell and/or or the serving cell for being used in random access resource allocation.

14. The method of claim 13, wherein the information further comprises at least one of the following: number of the preambles, random access resources used, associated synchronization signal blocks, associated reference signals, transmission powers, transmission times (time slots used), random access radio network temporary identifier, number of efforts using a certain preamble, number of efforts using a certain resource, order of the non-responded random access requests, information whether the random access request was part of the contention-based random access or contention-free random access procedure and information on radio channel measurements.

15. The method of claim 13, wherein the information further comprises information on responded random access requests.

16. The method of claim 13, wherein the information is cell-specific or beam-specific.

17. The method of claim 13, wherein the random access request cause is a handover or a beam failure recovery procedure.

18. A method comprising:
receiving, by an access node, information on not-responded random access requests or resources not used for random access requests, wherein the information comprises random access preambles;
analyzing the information for finding out resources used for unsuccessful random access attempts requests or not used for random access attempts requests, the resources being indicated by the random access preambles, and
avoiding allocating the resources used for unsuccessful random access attempts requests and/or or the resources not used for random access requests for further random access request transmissions.

19. The method of claim 18, wherein the information further comprises at least one of the following: number of the preambles, random access resources used, associated synchronization signal blocks, associated reference signals, transmission powers, transmission times (time slots used), random access radio network temporary identifier, number of efforts using a certain preamble, number of efforts using a certain resource, order of the non-responded random access requests, information whether the random access request was part of the contention-based random access or contention-free random access procedure and information on radio channel measurements.

20. The method of claim 18, wherein the information further comprises information on responded random access requests, further comprising preferring the resources used for the responded random access requests in allocating resources for the further random access request transmissions.

21. The method of claim 18, wherein the configuration further comprises a random access update release precondition for the least one handover candidate cell for the user device stop carrying out the measurements, if the random access update release precondition is fulfilled.

22. The method of claim 18, further comprising: instead of or in addition to the avoiding allocating, preferring in the allocating successfully used random access resources.

23. The method of claim 18, further comprising: instead of or in addition to the avoiding allocating, forwarding the information or result of the analyzing to another access node.

24. The method of claim 18, further comprising: instead of or in addition to the avoiding allocating, preferring in the allocating successfully used random access resources and instead of or in addition to the avoiding allocating or the preferring in the allocating, forward the information or result of the analyzing to another access node.

* * * * *